(12) United States Patent
Lee et al.

(10) Patent No.: US 6,344,525 B1
(45) Date of Patent: Feb. 5, 2002

(54) THERMOPLASTIC RESIN COMPOSITION

(75) Inventors: Tae Seung Lee, Kyungki-do; Kie Youn Jeong, Ulsan; Byung Yun Lim; Min Jae Hwang, both of Daejeon, all of (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/666,652

(22) Filed: Sep. 20, 2000

(30) Foreign Application Priority Data

Dec. 31, 1999 (KR) .............................. 99-68232

(51) Int. Cl.⁷ .......................... C08C 19/06; C08L 51/04
(52) U.S. Cl. ................ 525/384; 525/330.2; 525/331.7; 525/385
(58) Field of Search ............................... 525/384, 385, 525/330.2, 331.7

(56) References Cited

U.S. PATENT DOCUMENTS

| 4,785,045 A | 11/1988 | Yonekura et al. |
| 4,871,810 A | 10/1989 | Saltman |
| 4,968,752 A | 11/1990 | Kawamoto et al. |
| 5,206,294 A | 4/1993 | Dawson |

FOREIGN PATENT DOCUMENTS

| KR | 100199283 | 3/1999 |

*Primary Examiner*—Tae H. Yoon
(74) *Attorney, Agent, or Firm*—Birch, Stewart, Kolasch & Birch, LLP

(57) ABSTRACT

A thermoplastic resin composition of the present invention comprises (A) 5–45 parts by weight of polypropylene resin, (B) 10–50 parts by weight of ethylene-propylene-diene rubber, (C) 5–25 parts by weight of an ethylene copolymer, (D) 15–45 parts by weight of an ionomer, (E) 2–10 parts by weight of phenol cross-linking agent and 3–15 parts by weight of a cross-linking accelerator per 100 parts by weight of the (B), and (F) 3–15 parts by weight of epoxy polymer based on 100 parts by weight of the (D), wherein (A+B) is 30–40 parts by weight and (C+D) is 20–70 parts by weight. The thermoplastic resin composition is excellent in impact resistance at low temperature, heat resistance, weather resistance, scratch resistance and the vacuum formability, and is thus useful for the interior sheathing of an automobile.

9 Claims, No Drawings

THERMOPLASTIC RESIN COMPOSITION

BACKGROUND OF THE INVENTION

1. Field of the Invention

The present invention relates to a thermoplastic resin composition and more particularly, to a thermoplastic resin composition that exhibits excellent scratch resistance, heat resistance, weather resistance, scratch resistance, vacuum formability and impact strength at low temperature thus suitable for the fabrication of interior sheathing of an automobile.

BACKGROUND OF THE INVENTION

For many years, polyvinyl chloride (PVC) resins had been widely used in the fabrication of interior sheathing of an automobile; however, PVC resins are now known to have a few serious drawbacks such as the difficulty in recycling, generation of environmental hormones upon incineration and also a so-called fogging phenomenon induced by a platicizer introduced to said PVC with a view to providing a soft surface texture, wherein said plasticizer volatizes out of the interior parts of an automobile and eventually dews on the interior window of an automobile, and therefore there has been an urgent request to find a substitute material which can remedy said drawbacks present in PVC.

One of the strong candidate materials to substitute said PVC is thermoplastic polyolefin (TPO) material mainly comprising polypropylene and ethylene propylene rubber, and numerous companies have been exerting their efforts to develop a substitute material using TPO.

For example, Korean Patent No. 199283 disclosed a thermoplastic cross-linking elastomer mainly blended with polypropylene and cross-linked ethylene-propylene-diene rubber (EPDM) wherein said elastomer was used as a material for the outer layer of door panel of an automobile, and the Montell Company is attempting a thermoplastic polyolefin mainly composing of polypropylene and non-cross-linked ethylene propylene rubber as a PVC substitute for the same purpose.

U.S. Pat. No. 4,785,045 disclosed a thermoplastic cross-linking elastomer that used peroxide as a cross-linking agent for the skin material of door panel of an automobile.

The thermoplastic polyolefin materials are in general characterized by having a low density and a rather inexpensive cost of materials as well as excellent film formability thus providing an easier sheet production by extrusion forming or calendering forming. However, said thermoplastic polyolefins have a low melt strength to cause the deterioration of vacuum formability thus being inappropriate as such a material as an instrument panel of an automobile having deep drawing. Moreover, the low temperature range in vacuum forming of thermoplastic polyolefins makes it hard to finalize the optimal forming conditions and the inferior maintaining capacity of embossing attributes to the inapplicability to the fabrication of interior sheathing of an automobile.

In an effort to remedy said drawbacks of thermoplastic polyolefin materials, Du Pont Company attempted to improve the vacuum formability by enhancing both the melt strength and embossing maintaining capacity by adding an ionomer as a modifier to a polyolefin blend as disclosed in U.S. Pat. Nos. 5,206,294, 4,968,752 and 4,871,810. The new modified thermoplastic polyolefin materials by Du Pont Company are shown to have improved impact resistance at low temperature, scratch resistance, melt strength and vacuum formability; as a result, the new thermoplastic polyolefin materials are now expanding their applications to molded products such as an instrument panel of an automobile, which requires a high deep drawing.

Being adherent to metals, the ionomer resins are only applicable to extrusion sheet forming and are not applicable to calendering sheet forming. Further, the melt strength and the formability of said ionomer resins, although shown to be improved as compared with the conventional thermoplastic polyolefins, are still inferior to those of PVC.

SUMMARY OF THE INVENTION

The present invention has been completed by providing thermoplastic polyolefins, which is composed of polypropylene and ethylene-propylene-diene rubber, alloyed with low density polyethylene or polyethylene copolymer.

The object of the present invention is to provide a thermoplastic resin composition having excellent impact resistance at low temperature, heat resistance, weather resistance, scratch resistance, and vacuum formability, thus suitable for the fabrication of interior sheathing of an automobile.

DETAILED DESCRIPTION OF THE PRESENT INVENTION

A thermoplastic resin composition in accordance with the present invention comprises (A) 5–45 parts by weight of polypropylene resin, (B) 10–50 parts by weight of ethylene-propylene-diene rubber, (C) 5–25 parts by weight of an ethylene copolymer, (D) 15–45 parts by weight of an ionomer, (E) 2–10 parts by weight of phenol cross-linking agent and 3–15 parts by weight of a cross-linking accelerator per 100 parts by weight of the (B), and (F) 3–15 parts by weight of epoxy polymer based on 100 parts by weight of the (D), wherein (A+B) is 30–40 parts by weight and (C+D) is 20–70 parts by weight.

The present invention is described in detail hereunder.

The outer layer for the interior of an automobile in accordance with the present invention is prepared by alloying a thermoplastic polyolefin material, which is composed of polypropylene and ethylene-propylene-diene rubber, with a low density polyethylene or polyethylene copolymer.

(A) Polypropylene Resin

The examples of polypropylene resins used in the present invention are homo polypropylene, block or random copolymer of ethylene propylene, and they are used in the range of 5–45 parts by weight. The melt index thereof is in the range of 0.1–2 dg/min.

The amount of said polypropylene used in this invention can vary depending on the mechanical properties and surface hardness of the interior parts required. In order to maximize the melt strength of the final product, the amount of said polypropylene should be restricted to a minimum level while the amount of the ethylene copolymer be increased. If the amount of polypropylene is used more than the above range, the mechanical properties such as tensile strength and surface hardness are increased; however, the impact strength becomes decreased and both the vacuum formability and the calendering sheet formability become deteriorated.

(B) Ethylene-propylene-diene Rubber.

If the ethylene-propylene-diene rubber is cross-linked with the polypropylene resin mentioned above, heat resistance, weather resistance, sheet formability and embossing maintaining capacities are improved.

When peroxide is used as a cross-linking agent, the polypropylene becomes decomposed so that the mechanical properties of the alloy are deterioarted and subsequently the copolymer of either polyethylene or ethylene will participate in cross-inking thus the overall cross-linking cannot be under control.

On the contrary, when phenols or quinones are used as cross-linking agent, it will affect neither the decomposition nor the cross-linking reaction and will only have an influence on the ethylene-propylene-diene rubber; therefore, the methylol based phenol resin is preferred to be mainly used for the cross-linking of the ethylene-propylene-diene rubber in the present invention.

Examples of cross-linking accelerators are tin(II) chloride, zinc oxide, magnesium oxide, stearic acid or their mixture, and they can be used to control the rate of the cross-linking reaction and the degree of cross-linking.

In cross-linking, it is very crucial that blends are to be dynamically cross-linked under high shear stress upon mixing so that the size of the cross-linked rubber should be minutely distributed not to deteriorate the formability of said blends.

The cross-linked ethylene-propylene-diene rubber in the present invention is located as a domain that is minutely distributed within the matrix formed by the thermoplastic material composed of polypropylene, ethylene copolymer or its mixture, thus retaining its thermoplastic properties.

The ethylene-propylene-diene rubber in the present invention is excellent in ozone resistance and weather resistance, well miscible with the polyolefin materials, and can be selectively cross-linked by the phenol cross-linking agent let alone peroxide due to unsaturated bonds present among carbon atoms.

In the present invention, an ethylene-propylene-diene rubber is used 10–50 parts by weight, wherein the Mooney viscosity is 20–100 $ML_{1+4}$ at 100° C. If the amount of said ethylene-propylene-diene rubber is less than 10 parts by weight, the hardness becomes too high to be used for the outer layer of the interior parts of an automobile. And if the amount of said ethylene-propylene-diene rubber exceeds 50 parts by weight, the mechanical properties of the materials become poor.

(C) Ethylene Copolymer

An ethylene copolymer along with an ethylene-propylene-diene rubber can soften compositions of the present invention and thus enhance low temperature properties. Moreover, said ethylene copolymer can serve to improve the vacuum formability and the melt strength by increasing the temperature gap between the melting point and glass transmission temperature of the alloy.

An ethylene copolymer is selected from the group consisting of low-density polyethylene, ethylene-octane rubber, ethylene-alkylacrylate and their mixtures. Here, the preferred amount of ethylene copolymer is 5–25 parts by weight. If the amount of ethylene copolymer exceeds 25 parts by weight, the vacuum formability of the material becomes poor so that the interior parts of an automobile having high deep drawing are unable to be formed. On the other hand, if the amount is less than 5 parts by weight, the sheet formability is hard to be improved.

Among ethylene copolymers, the low-density polyethylene and ethylene-octene rubber provide an excellent compatibility with polypropylene and thus can produce the alloy having a wide range of glass transmission temperatures along with improved low temperature properties and melt strength thus incurring the improvement in the vacuum formability and the calendering sheet formability of said alloy. The density of polyethylene is in the range of 0.91–0.93 $g/cm^3$ and the melt index is in the range of 0.1–20 dg/min. The density of ethylene-octene rubber is 0.86–0.090 $g/cm^3$ and melt index is 10–30 dg/min.

Ethylene-alkylacrylate has excellent calendering formability and high melt strength and also provide excellent embossing maintaining capacity due to the absence of acrylic acids in their contents. Alkylacrylate used in the present invention is selected from the group consisting of methylacrylate, ethylacrylate and butylacrylate and it is preferred to use 15–45 weight %. If the amount of the alkylacrylate is less than 15 weight %, the melt strength is decreased so that the alkylacrylate material cannot be used to make the interior part of the automobile having deep drawing. On the other hand, if the amount exceeds 45 weight %, the adhesion to metals increases thus resulting in the deterioration of sheet formability.

(D) Ionomer

An ionomer is a copolymer such as ethylene-metacrylic acid or ethylene-acrylic acid, wherein 20–80% of acidic moiety is neutralized by a metal ion such as $Li^+$, $Na^+$ or $Zn^{++}$.

The melt strength and the embossing maintaining capacity of alloy materials can be much increased by cross-linking ethylene-propylene-diene rubber by the means of chemical or ionic bonds. In ionomers, the acrylic acid neutralized by a metal ion exhibits a structure cross-linked by an ionic bond at room temperature, and the ethylene component that forms the main backbone of said ionomer serves to expand the temperature range of the vacuum formability up to 180° C. by retaining said ionic bond, which is much higher than 90° C., the melting temperature of ethylene.

In the case of polymers containing acrylic acids among ethylene copolymers and ionomers where a part of acrylic acid is substituted by a metal ion, the resulting increased affinity for metals would incur the difficulty in calendering forming. To improve calendering forming, it is recommended that ethylene copolymers which do not contain acrylic acid such as ethylene ethylacrylate, ethylene methyl acrylate, ethylene butylacrylate, or their mixtures be used and nonpolar polymers such as low density polyethylene or ethylene-octene rubber can be also used as an alternative. However, the difficulty in chemical bonding with epoxides and negligible ionic strength in using said nonpolar polymers would result in the decrease of melt strength and embossing maintaining capacity, and thus it is more desirable to use in combination of acrylic acid ethylene copolymer or an ionomer. The above four different types of ethylene copolymers, i.e., an ethylene acrylic acid copolymer, an ethylene metacrylic acid copolymer, and ionomers of the above two copolymers wherein a part of acrylic acid are substituted for metal ions, are chemically bonded with materials having epoxy groups to form a network structure.

(E) Cross-linking Agent and Cross-linking Accelerator.

The cross-linking agent of the present invention used in cross-linking ethylene-propylene-diene rubber is methylol based phenol resin. Said methylol based phenol resin is used 2–10 parts by weight based on 100 parts by weight of the ethylene propylene rubber along with a cross-linking accelerator in order to control the rate of the cross-linking reaction, which is selected from the group consisting of tin(II) chloride, zinc oxide, magnesium oxide, stearic acid and their mixtures. It is preferred that 3–15 parts by weight of said cross-linking accelerator be used.

(F) Epoxy Polymers

Ethylene copolymers having acrylic acids such as ethylene acrylic acid and ethylene metacrylic acid and the above-mentioned ionomers can have chemical bonds with epoxy groups, through which the molecular weight of the ethylene copolymers becomes increased and forms a long side chain thus resulting in the increase in melt strength.

In general, reactants used for the above reaction are epoxy polymers and one example of said epoxy polymers is glycidyl metacrylic acid (herein after referred to as GMA), which is grafted with a polyolefin material or forms a copolymer by combining with an acrylic resin to be used. Another example of said epoxy polymers is polypropylene, where glycidyl metacrylate is grafted, or a glycidyl metacrylate copolymer, wherein the appropriate amount of the ionomer is determined according to the amount of the acrylic acid contained in said glycidyl metacrylate copolymer. Here, the more the amount of the polymer having glycidyl metacrylic acids, the greater the melt strength. The preferred amount of said polymer is 3–15 parts by weight based on 100 parts by weight of the ionomer.

When processing a sheet forming by means of a calendering method using the materials prepared in accordance with the present invention, it is highly recommended to use an activator. Examples of the activators include phosphoric acid activator, phosphate activator, polyethylene wax, polypropylene wax, silica, processed oil and acrylate terpolymer, etc. and the preferred amount of said activator is in the range of 0.01–3 parts by weight. Further, said activators and their mixtures can improve the calendering formability of materials. Activators do not generally affect the physical properties of alloy materials much, however, it is recommended to use adequate amount of activators in order to avoid the so-called fogging phenomenon considering that said activators are of low molecular weight.

Besides, other additives such as an antioxidant and a weather stabilizing agent and the like can be added in order to improve heat resistance and weather resistance of the modified thermoplastic polyolefin alloy materials.

The modified thermoplastic polyolefin materials are prepared by dynamically cross-inking said components using either an interior mixer such as a Banbury mixer and a Kneader or a twin screw extruder at 30–300 rpm for 2–10 min at 170–240° C.

The following examples are intended to be illustrative of the present invention and should not to be construed as limiting the scope of the present invention defined by the appended claims.

EXAMPLES 1–12

The thermoplastic resins are prepared according to the compositions and the their contents listed in Table 1 and the compounds used are as follow:

1) Polypropylene resin (PP-1): homo polypropylene, melt index of 5 dg/min;

2) Polypropylene resin (PP-2): random polypropylene, melt index of 10 dg/min;

3) Ethylene-propylene-diene rubber (EPDM-1): 40 weight % of propylene, 4.8 weight % of diene (5-ethylidene-2-norbornene), Mooney viscosity of $67ML_{1+4,100°\ C.}$, 50% of oil extended;

4) Polyethylene having low density: density of 0.915 $g/cm^3$, melt index of 5 dg/min;

5) Ethylene octene rubber (EOR): density of 0.870 $g/cm^3$, 20 weight % of octene, melt index of 10 dg/min, DDE Company product;

6) Ethylene methylacrylate: 20 weight % of methylacrylate, melt index of 3.0 dg/min, Exxon Company product;

7) Ethylene butylacrylate: 28 weight % of ethylene buthylacrylate, melt index of 1.5 dg/min, Borealis Company product;

8) Ethylene ethylacrylate: 35 weight % of ethyl acrylate, melt index of 20 dg/min, Du Pont product;

9) Ethylene acryl acid ionomer(1) neutralized by $Na^+$: density of 0.96 dg/cm3, melt index of 8 dg/min, Exxon Company product;

10) Ethylene metacrylic acids ionomer(2) neutralized by $Zn^{++}$: density of 0.97 dg/cm3, melt index of 1.0 dg/min, Du Pont Company product;

11) Methylol based phenol resin cross-linking agent: Schenectady Company product;

12) Stannous chloride (XA-1): $SnCl_2.H_2O$;

13) Zinc oxide (XA-2): ZnO;

14) GMA acrylate copolymer (GMA terpolymer): Du Pont Company product;

15) GMA graft polypropylene (PP-g-GMA): polypropylene resin where 3 weight % of GMA is grafted;

16) The mixture of zinc oxide and polyoxymethylene octadecyl ether phosphate (activator 1): Vanderbilt Company product;

17) Acrylate terpolymer (activator 2): Goodyear Company product.

In addition to the above components, a certain amount of a heat stablizer (1000 ppm) and a weather stabilizer (3000 ppm) were added, and the base material was colored to dark gray (CMB 2 weight %). The alloys were mixed by using a twin screw extruder at the speed of 150 rpm at 190–230° C. Samples produced according to ASTM standard were measured for their mechanical properties and the melt strength.

C: take-off becomes difficult
D: take-off becomes impossible
6. cross-linking rate: the weight % of sample residue that is not dissolved after 24 hours in the boiling xylene.

TABLE 1

| Classification | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Composition (parts by weight) | | | | | | | | | | | | |
| PP—1 | 30 | 30 | 30 | 30 | 30 | 30 | 30 | 30 | 20 | 15 | 20 | 15 |
| EPDM-1 | 40 | 40 | 40 | 40 | 40 | 40 | 40 | 40 | 40 | 40 | 40 | 40 |
| LDPP | — | — | — | — | — | — | — | — | 10 | 15 | — | — |
| EOR | — | — | — | — | — | — | — | — | — | — | 10 | 15 |
| Ionomer-1 | 30 | 30 | 30 | 30 | 30 | 30 | 30 | 30 | 30 | 30 | 30 | 30 |
| X | — | — | — | — | 0.5 | 1 | 2 | 1 | 1 | 1 | 1 | 1 |
| XA—1 | — | — | — | — | 0.5 | 0.5 | 0.5 | 0.5 | 0.5 | 0.5 | 0.5 | 0.5 |
| GMA Terpolymer | — | 1 | 2 | 4 | — | — | — | 2 | 2 | 2 | 2 | 2 |
| Physical properties | | | | | | | | | | | | |
| Hardness (shore, 25° C.) | 43D | 43D | 44D | 44D | 45D | 47D | 48D | 47D | 43D | 40D | 41D | 37D |
| Tensile strength (kgf/cm$^2$, 25° C. | 137 | 138 | 140 | 144 | 138 | 141 | 143 | 142 | 128 | 116 | 121 | 108 |
| Melt strength (kgf/cm$^2$,25° C.) | 11.3 | 13.1 | 14.7 | 16.5 | 11.2 | 11.2 | 11.3 | 14.8 | 15.1 | 15.3 | 15.2 | 15.3 |
| Weather stability (80° C., %) | 85 | 86 | 86 | 86 | 90 | 95 | 96 | 95 | 96 | 97 | 96 | 96 |
| Cross-linking rate (weight %) | 0 | 0 | 0 | 0 | 16.7 | 24.5 | 26.1 | 24.5 | 24.4 | 24.6 | 24.5 | 24.5 |
| Roll mill formability (175° C.) | o-D | o-D | o-D | o-D | Δ-C | o-C | o-C | o-C | o-C | ●-C | o-C | o-C |

The weather resistance was determined by using a zenon arc accelerated weathering tester. The degree of cross-linking reaction was evaluated by measuring the amount of each sample left after precipitating the pulverized material for 24 hours in boiling xylene.

The physical properties were tested based on the following standards.

[Test Method]

1. hardness (shore, D): ASTM D2240
2. tensile strength (kgf/cm$^2$): ASTM D412
3. melt strength (cN): the melt strength is measured upon the melt fracture is generated.
4. weather stability: the rate of tensile strength maintained is measured based on the initial tensile strength after weather resistance test using a zenon arc accelerated weathering tester at 80° C. for 200 hours.
5. roll-mill formability: after forming a sheet with the roll mill at 175° C., the smoothness and roll adhesion (or take-off property) of the sheet is tested. The result of the test is expressed as follows:
   ●: excellent sheet surface
   o: good sheet surface
   Δ: fair sheet surface
   x: poor sheet surface
   A: excellent take-off property
   B: very good take-off property The Table 1 shows that the thermoplastic resin in the Example 1 has relatively high melt strength due to the ionic strength generated by an ionomer as compared to the conventional thermoplastic olefins which usually have 5–6 cN. The result of roll mill formability shows that the sheet smoothness of the thermoplastic resin in the Example 1 is good but the roll adhesion rate is rather high, thus making the take-off impossible.

In the Examples 2–4, wherein glycidyl metacrylate terpolymer is added as a way to mediate a chemical reaction between the acrylic acid present in the ionomer in the Example 1 and the epoxy group of glycidyl metacrylate, the melt strength of the thermoplastic resin was increased as the amount of glycidyl metacrylate was increased, however, there was shown no improvement in the roll mill formability.

Examples 5–7 show the changes in physical properties the compositions of the Example 1 according to the dynamic cross-linking of the EPDM, where the double bond of the EPDM (ENB weight %) reacts with methylol based phenol, a cross-inking accelerator, and said cross-linking accelerator speeds up the rate of cross-linking reaction.

Although the rate of cross-linking reaction increases in proportion to the concentration of the cross-linking agent, it does not affect the melt strength. However, the increase in concentration of the cross-linking agent enhances the weather resistance and the take-off property in the roll mill formability.

Example 8 shows that the compositions having high melt strength, high heat resistance and high weather resistance are produced by simultaneously conducting both the dynamic cross-linking reaction of EPDM in the Example 1 and the chemical bonding between an ionomer and the epoxy group.

Examples 9–12 show thermoplastic resin compositions, where a certain amount of polypropylene in the example 8 is substituted for low-density polyethylene or ethylene-octene rubber so that the sheet smoothness and the adhesion are improved in the roll mill formability. Some of the mechanical properties decreased as the amount of the ethylene copolymer increased; however, the melt strength increased to some extent and the weather resistance and the cross-linking ability were well maintained while the hardness was decreased, thus providing soft surface.

EXAMPLES 13–24

Materials with a double net structure were prepared according to the compositions and contents listed in the following Table 2.

Examples 14–15 were performed the same as in the Example 13 with the exception that the amount of the ionomer was reduced while there was an increase in the amount of EMA. The decrease in the amount of the ionomer caused the melt strength to decrease; however, the decreased melt strength was still three times greater than that of the conventional thermoplastic olefins. The sheet smoothness in roll mill forming was excellent and the take-off property was also improved. However, the hardness was lowered and mechanical properties were also deteriorated to some extent.

Example 16 was performed the same as in the Example 15 with the exception that 10 parts by weight of the ionomer was substituted for EDMA. The overall physical properties such as hardness, mechanical property and the melt strength were shown to be deteriorated, however, the superior roll mill formability thus resulted enabled to form sheets by means of the calendering forming.

Examples 17–18 were performed the same as in the Example 15 with the exception that EMA was substituted for the same amount of EBA and EEa, respectively. In the case

TABLE 2

| Classification | Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Composition (weight %) | | | | | | | | | | | | |
| PP—2 | 20 | 20 | 20 | 20 | 20 | 20 | 10 | 30 | 20 | 20 | 20 | 20 |
| EFDM—2 | 30 | 30 | 30 | 40 | 30 | 30 | 40 | 20 | 30 | 30 | 30 | 30 |
| EMA | 5 | 15 | 25 | 25 | — | — | 15 | 15 | 15 | 25 | 25 | 25 |
| EBA | — | — | — | — | 25 | — | — | — | — | — | — | — |
| EEa | — | — | — | — | — | 25 | — | — | — | — | — | — |
| Ionomer-2 | 45 | 35 | 25 | 15 | 25 | 25 | 35 | 35 | 35 | 25 | 25 | 25 |
| X | 1.5 | 1.5 | 1.5 | 2 | 1.5 | 1.5 | 2 | 1 | 1.5 | 1.5 | 1.5 | 1.5 |
| XA-1 | 1 | 1 | 1 | 1 | 1 | 1 | 1 | 1 | 1 | 1 | 1 | 1 |
| XA-2 | 0.5 | 0.5 | 0.5 | 0.5 | 0.5 | 0.5 | 0.5 | 0.5 | 0.5 | 0.5 | 0.5 | 0.5 |
| GMA terpolymer | 4 | 3 | 2 | 1 | 2 | 2 | 3 | 3 | — | — | — | — |
| PP-g-GMA | — | — | — | — | — | — | — | — | 3 | 2 | 2 | 2 |
| Activator-1 | — | — | — | — | — | — | — | — | — | 1 | 1 | 2 |
| Activator-2 | — | — | — | — | — | — | — | — | — | — | 0.5 | 1 |
| Physical properties | | | | | | | | | | | | |
| Hardness (shore, 25° C.) | 40D | 38D | 35D | 31D | 34D | 35D | 32D | 46D | 38D | 40D | 41D | 39D |
| Tensile strength (kgf/cm$^2$, 25° C. | 116 | 110 | 105 | 98 | 103 | 106 | 85 | 130 | 115 | 104 | 104 | 103 |
| Melt strength (kgf/cm$^2$, 25° C.) | 18.3 | 16.3 | 14.8 | 12.1 | 14.7 | 14.9 | 16.6 | 15.5 | 15.8 | 14.8 | 14.7 | 14.6 |
| Weather stability (80° C., %) | 96 | 96 | 95 | 96 | 95 | 95 | 96 | 96 | 96 | 96 | 96 | 96 |
| Cross-linking rate (weight %) | 28.3 | 28.4 | 28.4 | 38 | 28.5 | 28.2 | 38.7 | 19 | 28.1 | 28.6 | 28.5 | 28.5 |
| Roll mill formability (175° C.) | o-D | o-C | ●-C | ●-B | ●-C | ●-C | o-C | o-D | o-C | ●-A | ●-A | ●-A |

Example 13 showed relatively high melt strength and this was because the GMA terpolymer increased as the amount of the ionomer increased. In addition, the vacuum formability, the embossing maintaining capacity, the mechanical properties and the weather stability were all shown to be very good; however, the take-off was impossible in the roll mill forming.

of the ethylene alkyl acrylate (EMA, EBA, EEa), the change in mechanical properties due to the different kinds of alkyl acrylates was not observable and the roll mill formability was shown to be improved as in Examples 13–15 as the amount of ethylene alkyl acrylate increased.

Examples 19–20 were performed the same as in the Example 14 with the exception that the amount of polypropylene and EPDM were modified. Here, the surface hardness and the mechanical properties were improved as the amount of the PP increased while both the melt strength and the take-off property were worsened.

Example 21 was performed the same as in the Example 14 with the exception that the GMA terpolymer in the composition of Example 14 was substituted for the same amount of PP-g-GMA. The PP-g-GMA was prepared by reacting the block or random copolymer polypropylene resin with the peroxide, a styrene monomer and a GMA monomer in a twin screw extruder at 160–220° C.

The PP-g-GMA substitution resulted in the decrease of melt strength as compared when the GMA terpolymer was used due to the relatively small GMA content in said PP-g-GMA. However, there were improvements in mechanical properties and compatibilities of PP/EPDM and ionomers, thus resulting in the enhancement in elongation and distributing property.

Examples 22–24 utilized activators to increase the roll mill formability (the sheet smoothness and the take-off property), wherein the activator 1 is a mixture of the roll mill formability of ionomers as compared to the conventional activators such as polyethylene wax, polypropylene wax and silica activators. The above activators did not affect the physical properties except the roll mill formability.

As described above, the thermoplastic resin composition comprising polypropylene resin, ethylene-propylene-diene rubber, ethylene copolymer, ionomer, cross-linking agent, cross-linking accelerator, and epoxy polymers demonstrated excellent impact resistance at low temperature, heat resistance, weather resistance, scratch resistance and vacuum formability, thus useful for the interior sheathing of an automobile.

What is claimed is:

1. A thermoplastic resin composition comprising:
   (A) 5–45 parts by weight of polypropylene resin;
   (B) 10–50 parts by weight of ethylene-propylene-diene rubber;
   (C) 5–25 parts by weight of ethylene copolymer;
   (D) 15–45 parts by weight of ionomer, wherein (A+B) is 30–40 parts by weight and (C+D) is 20–70 parts by weight;
   (E) 2–10 parts by weight of phenol cross link agent and 3–15 parts by weight of a cross linking accelerator based on 100 parts by weight of said (B); and;
   (F) 3–15 parts by weight of epoxy polymer based on 100 parts by weight of said (D).

2. A thermoplastic resin composition according to claim 1, wherein said polypropylene resin (A) is homopolypropylene or ethylene-propylene block or random copolymer, and has a melt index of 0.1–20 dg/min when measured by ASTM D1238 (230° C./10 kg), whereas ethylene-propylene-diene rubber (B) is composed of 20–50 weight % of propylene having 20–100 $ML_{1+4}$ at 100° C. and a diene content of 2–8 weight %.

3. A thermoplastic resin composition according to claim 1, wherein the ionomer is an acid component selected from ethylene acrylic acid and ethylene methacrylic acid wherein 20–80% of the acid component is substituted with a metal ion, having a density of 0.94–0.97 g/cm$^3$, and a melt index of 0.1–20 dg/min when measured by ASTM D1238 (230° C./10 kg).

4. A thermoplastic resin composition according to claim 3, wherein the metal ion is selected from the group consisting of $Li^+$, $Na^+$ and $Mg^+$.

5. The thermoplastic resin composition according to claim 1, wherein the cross link agent is methylol based phenol resin, the cross-link accelerator is selected from the group consisting of tin(II)chloride, zinc oxide and magnesium oxide.

6. A thermoplastic resin composition according to claim 1, wherein the polymer having an epoxy group is either polypropylene resin or glycidyl methacrylates copolymer where glycidyl metacrylate is grafted.

7. The thermoplastic composition according to claim 1, wherein the ionomer is an acidic moiety selected from the group consisting of ethylene-methacrylic acid and ethylene acrylic acid.

8. A thermoplastic resin composition comprising:
   (A) 5–45 parts by weight of polypropylene resin;
   (B) 10–50 parts by weight of ethylene-propylene-diene rubber;
   (C) 5–25 parts by weight of a compound selected from the group consisting of low-density polyethylene, ethylene octene rubber, and ethylene alkylacrylate or mixtures thereof;
   (D) 15–45 parts by weight of ionomer, wherein (A+B) is 30–40 parts by weight and (C+D) is 20–70 parts by weight;
   (E) 2–10 parts by weight of phenol cross link agent and 3–15 parts by weight of a cross linking accelerator based on 100 parts by weight of said (B); and;
   (F) 3–15 parts by weight of epoxy polymer based on 100 parts by weight of said (D).

9. A thermoplastic resin composition according to claim 8, wherein the low density polyethylene has 0.91–0.93 g/cm$^3$ of density, 0.1–20 dg/min of melt index; the ethylene-octene rubber has 0.86–0.90 g/cm$^3$ of density, 10–30 weight % of octane content, and 0.1–30 dg/min of melt index when measured by ASTM D1238 (230° C./10 kg); and the ethylene alkyl acrylate, wherein its alkyl group is selected from the group consisting of methyl, ethyl and butyl group, has 15–45 weight % of alkyl acrylate content and 1–100 dg/min of melt index when measured by ASTM D1238 (230° C./10 kg).

* * * * *